United States Patent
Schodin et al.

(10) Patent No.: US 11,654,490 B2
(45) Date of Patent: May 23, 2023

(54) APPARATUS HAVING A MOVABLE CHAMBER

(71) Applicant: HEWLETT-PACKARD DEVELOPMENT COMPANY, L.P., Houston, TX (US)

(72) Inventors: Christopher Paul Schodin, San Diego, CA (US); Krzysztof Nauka, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1032 days.

(21) Appl. No.: 16/076,370

(22) PCT Filed: Apr. 18, 2017

(86) PCT No.: PCT/US2017/028153
§ 371 (c)(1),
(2) Date: Aug. 8, 2018

(87) PCT Pub. No.: WO2018/194567
PCT Pub. Date: Oct. 25, 2018

(65) Prior Publication Data
US 2021/0197285 A1    Jul. 1, 2021

(51) Int. Cl.
*B22F 12/00* (2021.01)
*B33Y 10/00* (2015.01)
(Continued)

(52) U.S. Cl.
CPC .............. *B22F 12/38* (2021.01); *B22F 10/14* (2021.01); *B22F 10/64* (2021.01); *B22F 10/77* (2021.01);
(Continued)

(58) Field of Classification Search
CPC .......... B22F 12/37; B22F 12/38; B22F 12/43; B22F 10/14
See application file for complete search history.

(56) References Cited

U.S. PATENT DOCUMENTS 5,354,414 A * 10/1994 Feygin .................... B22F 10/20
216/34
7,270,528 B2 * 9/2007 Sherwood ........... B29C 35/0805
425/174.4
(Continued)

FOREIGN PATENT DOCUMENTS

CN    103521767 A    1/2014
DE    102010046467 A1    3/2012
(Continued)

OTHER PUBLICATIONS

Dawes et al., "Introduction to the Additive Manufacturing Powder Metallurgy Supply Chain", Johnson Matthey Technol. Rev., vol. 59, Issue No. 3, Retrieved from internet—https://www.technology.matthey.com/article/59/3/243-256/, 2015, pp. 243-256.

*Primary Examiner* — Nicholas A Wang
(74) *Attorney, Agent, or Firm* — Shook, Hardy & Bacon L.L.P.

(57) ABSTRACT

According to examples, an apparatus may include a build platform and a chamber. The chamber may support a layer forming station including a spreading component to spread a layer of build material particles onto the build platform and an agent delivery component to apply fusing agent onto selected locations on the spread layer of build material particles and a heating station including a heating component to apply energy onto the spread layer of build material particles and the applied fusing agent, in which the heating station is separated from the layer forming station. The apparatus may also include an actuator to move the chamber with respect to the build platform or vice versa while (Continued)

maintaining the separation between the layer forming station and the heating station.

11 Claims, 7 Drawing Sheets

(51) Int. Cl.
  *B33Y 30/00* (2015.01)
  *B22F 10/14* (2021.01)
  *B22F 12/37* (2021.01)
  *B22F 10/64* (2021.01)
  *B22F 12/80* (2021.01)
  *B22F 12/43* (2021.01)
  *B22F 10/77* (2021.01)
  *B33Y 40/00* (2020.01)

(52) U.S. Cl.
  CPC .............. *B22F 12/37* (2021.01); *B22F 12/43* (2021.01); *B22F 12/80* (2021.01); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2006/0108712 A1* | 5/2006 | Mattes | B33Y 30/00 264/308 |
| 2012/0211155 A1* | 8/2012 | Wehning | A61C 13/0018 156/275.5 |
| 2016/0129502 A1 | 5/2016 | Varetti | |
| 2016/0136730 A1 | 5/2016 | Mcmurtry et al. | |
| 2016/0243618 A1* | 8/2016 | Heugel | B22F 12/00 |
| 2017/0014907 A1 | 1/2017 | Ng et al. | |
| 2017/0072466 A1* | 3/2017 | Zehavi | B22F 10/70 |
| 2017/0072467 A1* | 3/2017 | Zehavi | B33Y 30/00 |
| 2017/0072636 A1* | 3/2017 | Ng | B29C 64/205 |
| 2017/0072644 A1* | 3/2017 | Ng | B29C 64/112 |
| 2017/0297106 A1* | 10/2017 | Myerberg | B22F 7/02 |
| 2018/0200835 A1* | 7/2018 | Chae | B29C 64/268 |
| 2018/0257299 A1* | 9/2018 | Ng | B29C 64/268 |
| 2020/0016655 A1* | 1/2020 | Crump | B22F 12/00 |

FOREIGN PATENT DOCUMENTS

| | | |
|---|---|---|
| WO | 2013044047 A1 | 3/2013 |
| WO | 2016084350 A1 | 6/2016 |

\* cited by examiner

APPARATUS HAVING A MOVABLE CHAMBER

BACKGROUND 3D manufacturing apparatuses that employ additive manufacturing techniques to build or print parts are gaining in popularity and use. The additive manufacturing techniques typically employ a layering process in which particles of build material are spread into a layer and selectively fused together. Following that process, additional particles are spread into another layer and selectively fused together. This process is repeated over a number of layers to build up a 3D part having a desired configuration.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are apparatuses and methods for performing 3D printing operations. Particularly, the apparatuses discloses herein may include a chamber that may support a layer forming station and a heating station. The chamber may also include a pulse irradiating station. The chamber may support the layer forming station, the heating station, and the pulse irradiating station such that the layer forming station, the heating station, and the pulse irradiating station may be maintained in a spaced relationship with respect to each other. The apparatuses disclosed herein may also include a build platform housed within the chamber and an actuator that may move the chamber with respect to the build platform while maintaining the spaced relationship between the layer forming station, the heating station, and the pulse irradiating station. The apparatuses disclosed herein may further include a gas circulation system to control an environmental condition within the chamber.

In some examples, the chamber may be mounted to a rotatable member such that chamber may be rotated about an axis of rotation while the build platform is maintained in a stationary position. In addition or in other examples, the chamber may be laterally movable with respect to the build platform. In any of these examples, the chamber may be moved (rotated or laterally moved) to a first position in which the build platform is positioned beneath the layer forming station. Following the formation of a layer of build material particles, the chamber may be moved (rotated or laterally moved) to a second position in which the build platform is positioned beneath the heating station. Following heating of the build material particles, the chamber may be moved (rotated or laterally moved) to a third position in which the build platform is positioned beneath the pulse irradiating station.

Through implementation of the apparatuses and methods disclosed herein, various components that perform functions on build material particles may be maintained in a spaced relationship with each other. For instance, heat from the heating station and the pulse irradiating station may not adversely affect spreading/printing components in the layer forming station. In addition, build material particles manipulated by the layer forming station may not adversely affect the heating component in the heating station and a pulse irradiating component in the pulse irradiating station.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1A:
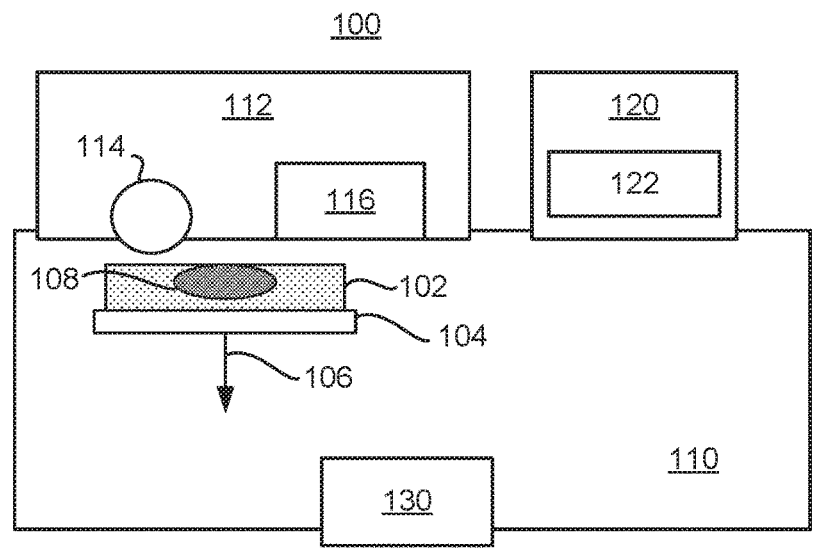
FIGS. 1A and 1B, respectively, show block diagrams of an example apparatus that may be implemented to fabricate 3D objects during two stages of operation.
Figure 1B:
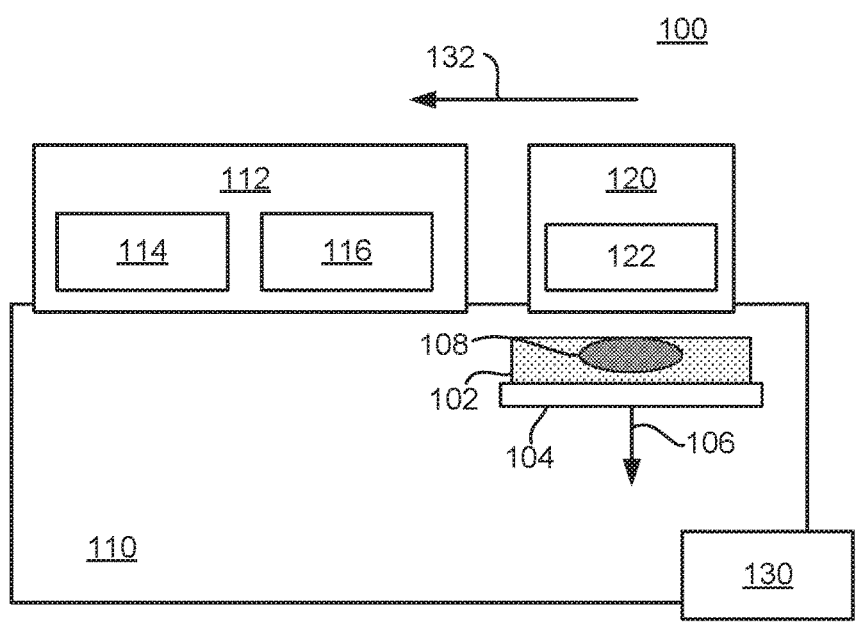

With reference first to FIGS. 1A and 1B, there are respectively shown block diagrams of an example apparatus 100 that may be implemented to fabricate three-dimensional (3D) objects during two stages of operation. It should be understood that the apparatus 100 depicted in FIGS. 1A and 1B may include additional components and that some of the components described herein may be removed and/or modified without departing from a scope of the apparatus 100 disclosed herein.

The apparatus 100 may be a 3D fabricating device, a 3D printer, or the like, that may be implemented to fabricate 3D objects from build material particles 102. The apparatus 100 may include a build platform 104 on which the 3D objects may be fabricated from build material particles 102. Particularly, for instance, the build platform 104 may be vertically movable as denoted by the arrow 106 such that portions 108 of 3D objects may be fabricated from multiple layers of build material particles 102. That is, portions 108 of 3D objects may be fabricated from successive layers of build material particles 102 and the build platform 104 may be lowered between formation of the portions 108 on the successive layers, for instance, to maintain an uppermost layer of build material particles 102 at a certain height.

As shown in FIG. 1A, the build platform 104 may be housed inside of a chamber 110, which may also be called a vessel, a container, a capsule, or the like. The chamber 110 may support a layer forming station 112, which may include a spreading component 114 and an agent delivery component 116. The chamber 110 may also support a heating station 120, which may include a heating component 122. That is, for instance, the chamber 110 may include features to support the layer forming station 112 and the heating station 120 in a separated relationship with respect to each other. The separation between the spreading component 114/agent delivery component 116 and the heating component 122 may reduce contamination of the heating component 122 by build material particles 102 that may become airborne during a layer spreading operation. Likewise, the separation may reduce transmission of heat from the heating component 122 to the agent delivery component 116, which may prolong the life of the agent delivery component 116.

In some examples, the chamber 110 may include respective cutouts through which portions of the layer forming station 112 and the heating station 120 may extend. In addition or in other examples, the chamber 110 may include a window through which radiation from the heating component 122 may be directed into the chamber 110. In addition or in yet other examples, the layer forming station 112 and the heating station 120 may be mounted to an interior surface of the chamber 110. In any regard, because the layer forming station 112 and the heating station 120 may be mounted to the chamber 110, the heating station 120 may be maintained in a spaced relationship, e.g., separated, from the layer forming station 112.

In operation, the spreading component 114 may spread build material particles 102 across the build platform 104 to form a layer of build material particles 102. The spreading component 114 may be a spreader, a roller, a doctor blade, or the like, and the build material particles 102 may be a powder material composed of, e.g., a polymer, a plastic, a nylon, a metal, a combination thereof, or the like material. The spreading component 114 may be supported on a movable carriage or may otherwise be movable laterally with respect to the build platform 104. During a build material particle 102 spreading operation, a pile of build material particles 102 may be provided between the spreading component 114 and the build platform 104 and the spreading component 114 may spread the pile of build material particles 102 on the build platform 104 or on a previous layer of build material particles 102. In some examples, the spreading component 114 may rotate, e.g., in a direction counter to the direction in which the spreading component 114 is translated across the build platform 104 during spreading of the build material particles 102.

The build material particles 102 may have micron or sub-micron level sizes to enable accurate formation of 3D objects from the build material particles 102. In addition, the layer of build material particles 102 may be spread to have a height that is millimeter or sub-millimeter level, e.g., micron level. By way of particular example, the layer of build material particles 102 may have a height of between about 90 microns to about 200 microns.

Following the spreading of the build material particles 102 into the layer, the agent delivery component 116 may be operated to apply a fusing agent onto selected locations on the spread layer of build material particles 102. The selected locations may be the locations of the layer of build material particles 102 that are to be fused together to form the portion 108 of in the layer. The agent delivery component 116 may be supported on a carriage that may be movable laterally in one or two dimensions with respect to the build platform 104 such that the agent delivery component 116 may deliver fusing agent onto various locations on a layer of build material particles 102 provided on the build platform 104. The agent delivery component 116 may apply fusing agent over one or multiple passes.

The fusing agent may be an ink or other liquid that is to enhance energy absorption and may be selected according to the type of energy that is to be applied onto the build material particles 102. As such, different types of fusing agents may enhance energy absorption of different types of energy at different levels. The fusing agent may also be selected based upon the type of material from which the build material particles 102 are composed. According to examples, the agent delivery component 116 may be a printhead and the fusing agent may be an ink delivered from the printhead. In addition, or in other examples, the agent delivery component 116 may include multiple printheads that may deliver the same or different types of fusing agents with respect to each other. In these examples, the different fusing agents may have different colors with respect to each other and/or may affect the build material particles 102 differently with respect to each other. For instance, a fusing agent may enhance energy absorption while another fusing agent may reduce energy absorption, which may be used to better define boundaries of the section 108.

In other examples, the fusing agents may change a chemical composition of the build material particles 102, e.g., for printed metal, black ink providing carbon may become incorporated into a printed stainless steel, ink containing nanoparticles of metal that may be locally added into the printed metal (e.g., Cu into Al-alloy, Cr into Ti-alloy), etc. The fusing agents may also include energetics ink, e.g., ink containing compounds that release substantial amounts of energy when they decompose at elevated temperatures as may occur during exposure of build material particles 102 to pulse irradiation. This additional heat energy may be used for boosting the melting process of the build material particles 102, particularly when the build material particles 102 are metallic particles.

In any regard, following application of the fusing agent onto the selected locations of the layer of build material particles 102, an actuator 130 may move the chamber 110 with respect to the build platform 104. In this regard, the build platform 104 may be supported separately from the chamber 110 such that the chamber 110 may be moved without moving the build platform 104. The actuator 130 may be any suitable type of actuator that is able to cause relative movement between the chamber 110 and the build platform 104. In some examples, the actuator 130 may be a motor that is to drive a wheel such that rotation of the wheel causes the chamber 110 to be translated. For instance, the wheel may be attached to a belt and pulley system, a gearing system, etc., and the chamber 110 may be movably supported on a floor or a track. In any regard, the actuator 130 may cause the chamber 110 to be translated with respect to the build platform 104.

The relative translation of the chamber 110 with respect to the build platform 104 may be seen by comparing the diagrams shown in FIGS. 1A and 1B. As shown in FIG. 1B, the chamber 110 is depicted as having been translated in the direction indicated by the arrow 132 a sufficient distance to position the build platform 104 beneath the heating component 122 of the heating station 120. In this regard, the chamber 110 may be moved to place the topmost layer of build material particles 102 in a position to receive energy from the heating component 122. In addition, the heating component 122 may be activated to apply energy onto the topmost layer of build material particles 102. The energy may be light, heat, radiation, combinations thereof, or the like that is to heat build material particles 102. By way of example, the heating component 122 may be a quartz, tungsten, halogen (QTH) lamp.

In some examples, the heating component 122 may supply a sufficient amount of energy to raise and maintain the temperature of the build material particles 102 on which the fusing agent has been applied in accordance with a predefined temperature profile. For instance, the heating component 122 may apply energy 220 to raise the temperature of the build material particles 102 to a particular level such that application of a burst of radiation by the pulse irradiating component causes build material particles 102 upon which fusing agent has been delivered to melt. In other examples, the heating component 122 may supply a sufficient amount of energy to cause build material particles 102 upon which the fusing agent has been applied to melt, such that the melted build material particles 102 may fuse to each other and to build material particles 102 in a previously spread layer as the melted build material particles 102 hardens.

Following application of energy onto the topmost layer of build material particles 102, the actuator 130 may be operated to move the chamber 110 back to a position in which the build platform 104 is located beneath the layer forming station 112. That is, the chamber 110 may be positioned as shown in FIG. 1A. Additionally, a next layer of build material particles 102 may be spread on top of a previous layer of build material particles 102 and fusing agent may be applied onto selected locations of the next layer. Moreover, the chamber 110 may be moved again to the position shown in FIG. 1B. This process may be repeated until the portions 108 of the 3D object have been formed. The unfused build material particles 102 may be removed from the portions 108 to expose the 3D object.

Particular reference is made above and throughout the present disclosure of the actuator 130 moving the chamber 110 with respect to the build platform 104. In addition, or in other examples, the actuator 130 may move the build platform 104 with respect to the chamber 110 without departing from a scope of the apparatus 100 disclosed herein. Additionally, either or both of the layer forming station 112 and the heating station 120 may be vertically movable, e.g., such that layer forming station 112 and/or the heating station 120 may be moved during movement of the chamber 110.

In the examples depicted in FIGS. 1A and 1B, the relative movement between the chamber 110 and the build platform 104 may be a relative lateral movement. However, in other examples, the relative movement may be a relative rotational movement as shown and described with respect to FIGS. 2A-2C. Particularly, FIGS. 2A-2C, respectively, depict block diagrams of another example apparatus 200 during multiple stages of operation. It should be understood that the apparatus 200 depicted in FIGS. 2A-2C may include additional components and that some of the components described herein may be removed and/or modified without departing from a scope of the apparatus 200 disclosed herein. The apparatus 200 may be similar to the apparatus 100 depicted in FIGS. 1A and 1B and may thus include many of the same elements as those discussed above with respect to the apparatus 100. The common elements will therefore not be described in great detail with respect to FIGS. 2A-2C.

Figure 2A:
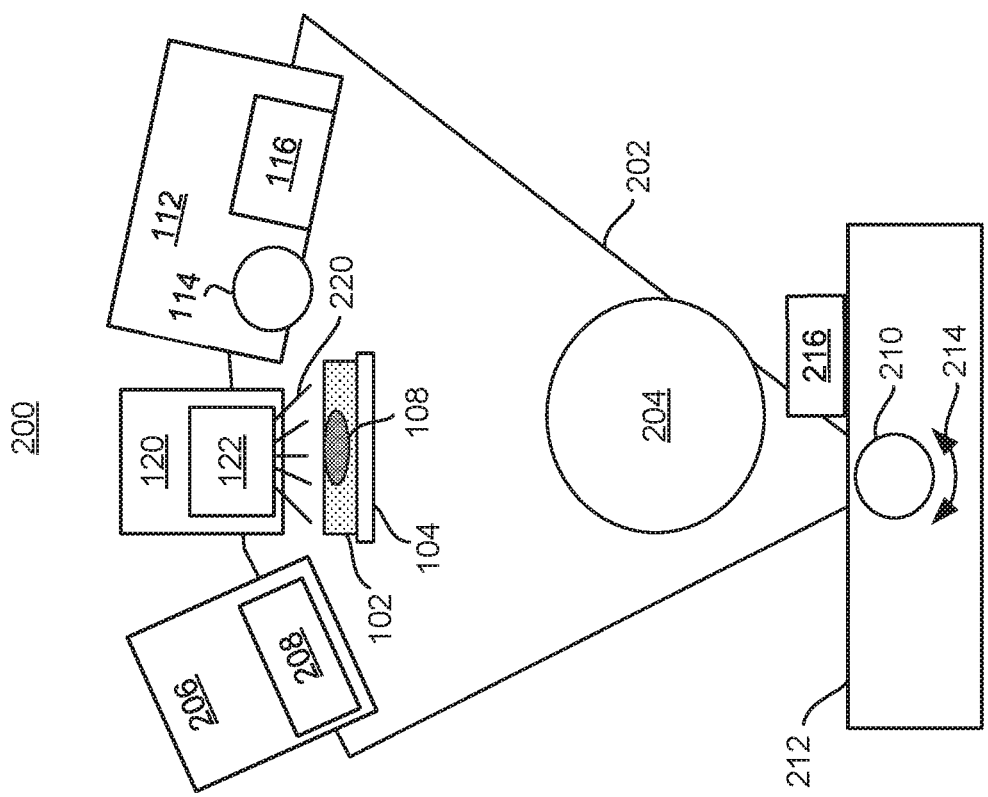
FIGS. 2A-2C, respectively, depict block diagrams of another example apparatus during multiple stages of operation.

With reference first to FIG. 2A, the apparatus 200 may include a build platform 104 on which the 3D objects may be fabricated from build material particles 102. The build platform 104 may be vertically movable as denoted by the arrow 106 such that portions 108 of 3D objects may be fabricated from multiple layers of build material particles 102 as described above. The build platform 104 may be housed inside of a chamber 202 and the environmental conditions within the chamber 202 may be controlled by a gas circulation system 204. The gas circulation system 204 may control a composition of gases contained inside the chamber 202 through, for instance, introduction of particular gases into the chamber. By way of example, the gas circulation system 204 may introduce an inert gas to replace and/or mix with oxygen inside the chamber 202 to reduce or prevent oxidation of the build material particles 102 when energy, e.g., heat, radiation, or the like, is applied to the build material particles 102.

In some examples, the fusing agent may be a water-based ink or other type of agent containing water or other liquid. In these examples, the water or other liquid may vaporize when energy is applied onto the fusing agent. The gas circulation system 204 may be implemented to also remove the vapor from inside the chamber 202. For instance, the gas circulation system 204 may recover the vapor, condense the vapor into a liquid, and expel the liquid out of the chamber 202.

In any regard, the chamber 202 may support the layer forming station 112 and the heating station 120. The chamber 202 may also support a pulse irradiating station 206 that includes a pulse irradiating component 208. The pulse irradiating component 208 may be a device that is to provide an instantaneous pulse, burst, flash, or sub-flashes of radiation in the form of electromagnetic radiation onto a topmost layer of build material particles 102 after the heating component 122 has applied energy to the topmost layer of build material particles 102. The pulse of radiation may be applied to instantaneously raise the temperature of the build material particles 102 on which the fusing agent has been applied to a point at which a desired transformation, such as melting, sintering, etc., may occur. By way of example, the pulse irradiating component 208 may be a lamp, such as a xenon lamp, a quartz tungsten halogen lamp, or the like. In another example, the pulse irradiating component 208 may be laser or a bank of lasers for which the radiation emitted from the laser or lasers may be diffused and homogenized to provide multidirectional and uniform illumination. By way of particular example, the pulse of radiation may be applied for a duration of time that is less than about 2 seconds and in other examples, less than about 100 ms. Additionally, the term "radiation" as used herein may be defined as a region of electromagnetic spectrum that is to raise the temperature of the irradiated material when the material absorbs the electromagnetic spectrum.

The chamber 110 may include features to support the layer forming station 112, the heating station 120, and the pulse irradiating station 206 in a separated relationship with respect to each other. By way of example, the chamber 110 may include respective cutout sections through which portions of the layer forming station 112, the heating station 120, and the pulse irradiating station 206 may extend. In addition or in other examples, the chamber 110 may include windows through which energy from the heating component 122 and radiation from the pulse irradiating component 208 may be directed into the chamber 110. In addition or in yet other examples, the layer forming station 112, the heating station 120, and the pulse irradiating station 206 may be mounted to an interior surface of the chamber 110. In any regard, because the layer forming station 112, the heating station 120, and the pulse irradiating station 206 may be mounted to the chamber 110, the layer forming station 112, and the pulse irradiating station 206 may be maintained in a spaced relationship, e.g., separated, with respect to each other.

The chamber 202 may be mounted to a pivot member 210 that is rotatably mounted to a base member 212. As shown, the pivot member 210 may rotate as denoted by the arrow 214, e.g., in both clockwise and counter-clockwise directions, in which rotation of the pivot member 210 may cause the chamber 202 to rotate in the same direction as the pivot member 210. An actuator 216, such as an electric motor, may rotate the chamber 202 and/or the pivot member 210 in the directions denoted by the arrow 214. The actuator 216 may, for instance, include a gearing system to cause the pivot member 210 to rotate. In addition or in other examples, the actuator 216 may be connected to a belt and pulley system that translates rotation of the actuator 216 to rotation of the chamber 202. In any regard, the build platform 104 may be supported separately from the chamber 202 such that the chamber 302 may be rotated without also causing the build platform 104 to rotate.

Figure 2B:
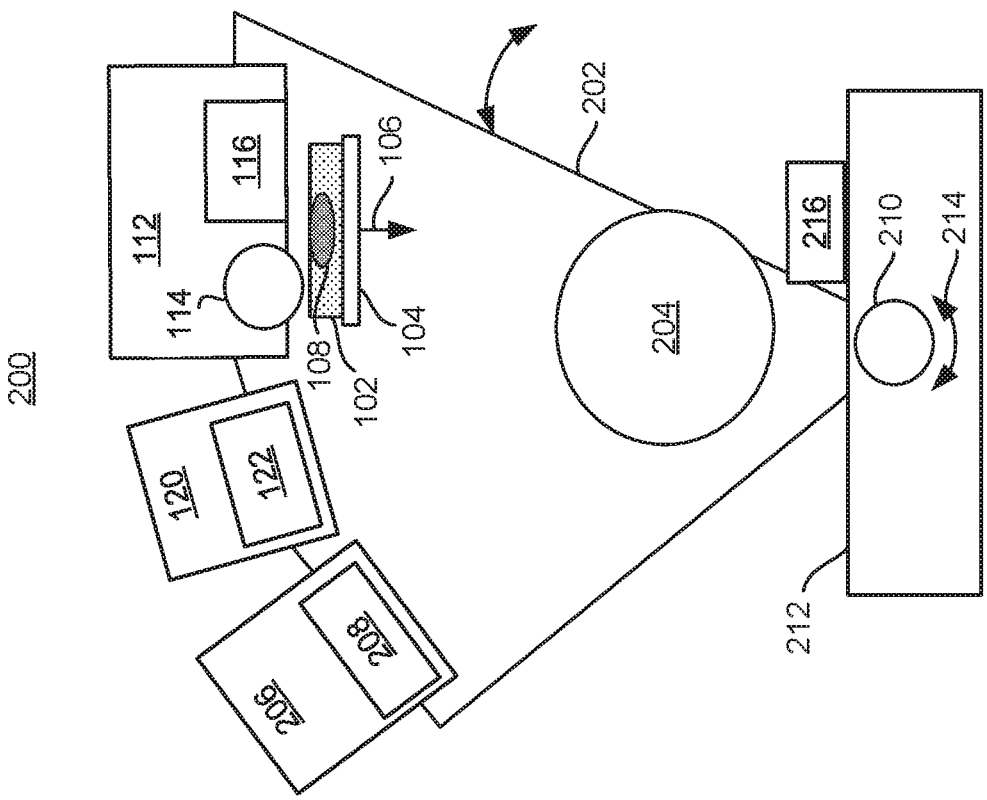

FIG. 2A shows a first stage of operation of the apparatus 200 in which the build platform 104 is positioned beneath the layer forming station 112. While in this position, a layer of build material particles 102 may be spread and a fusing agent may be applied onto selected areas of the spread layer of build material particles 102 as discussed herein. Following application of the fusing agent, the chamber 202 may be rotated such that the build platform 104 is positioned beneath the heating component 122. This position of the chamber 202 is depicted in FIG. 2B. Additionally, while in the position depicted in FIG. 2B, the heating component 122 may be activated to apply energy 220 onto the layer of build material particles 102 and the fusing agent to raise and maintain the temperature of the build material particles 102 on which the fusing agent has been applied in accordance with a predefined temperature profile. For instance, the heating component 122 may apply energy 220 to raise the temperature of the build material particles 102 to a particular level such that application of a burst of radiation by the pulse irradiating component 208 causes build material particles 102 upon which fusing agent has been delivered to melt. According to examples, the build platform 104 may include heaters, e.g., resistors, to also heat the build material particles 102.

Figure 2C:
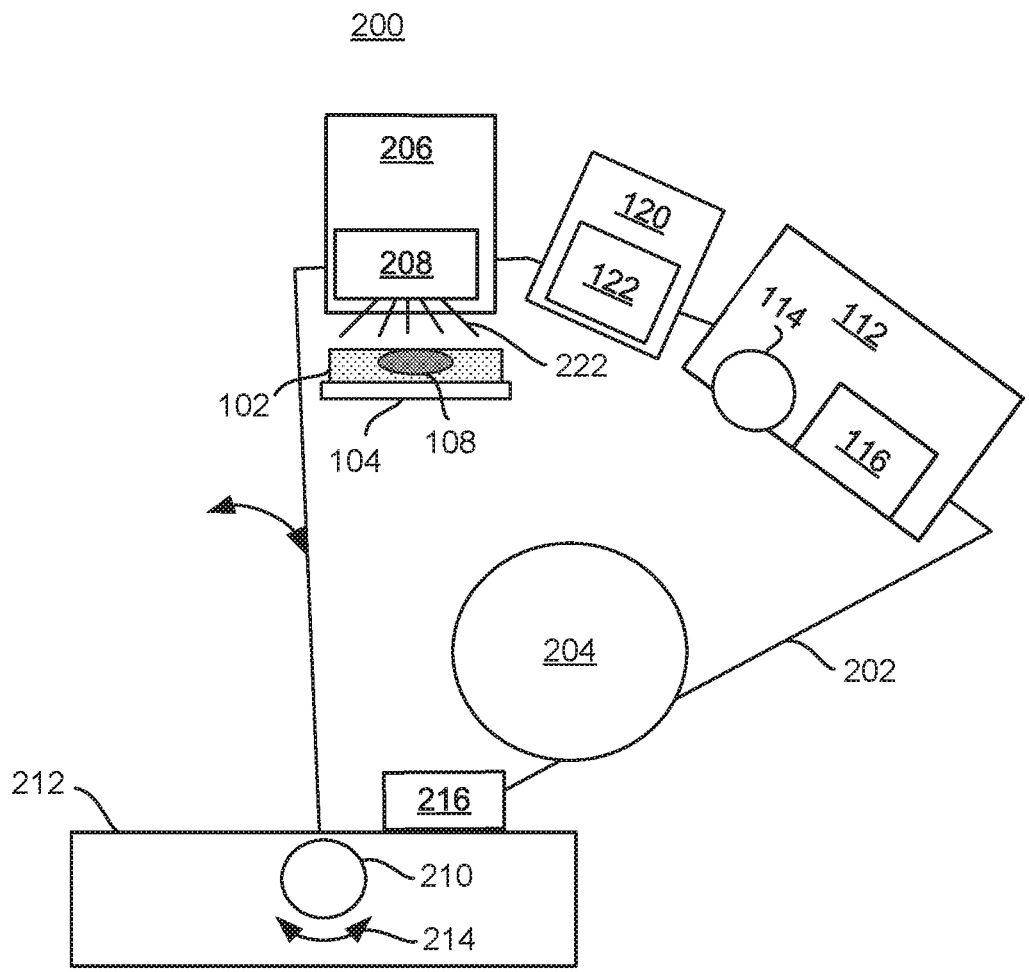

Following application of the energy 220, the chamber 202 may be rotated such that the build platform 104 is positioned beneath the pulse irradiating component 208. This position of the chamber 202 is depicted in FIG. 2C. Additionally, while in the position depicted in FIG. 2C, the pulse irradiating component 208 may be activated to apply an irradiation pulse 222 onto the layer of build material particles 102. The irradiation pulse 222 may be of sufficient energy to cause build material particles 102 upon which fusing agent has been delivered to melt without causing build material particles 102 upon which fusing agent has not been delivered to melt. The energy level of the irradiation pulse 222 may thus be based upon the type of material used in the build material particles 102, the type of fusing agent deposited, the environment conditions inside the chamber 202, etc. By way of example, the energy level of the irradiation pulse 222 may be determined through testing of various materials and conditions.

Following application of the irradiation pulse 222, the build material particles 102 on the topmost layer of build material particles 102 upon which the fusing agent has been delivered may have melted and may begin to harden as those build material particles 102 begin to cool. In addition, the chamber 202 may be rotated in an opposite direction to again position the build platform 104 beneath the layer forming station 112. That is, the chamber 202 may be returned to the position shown in FIG. 2A. In addition, the chamber 202 may be rotated to the heating and pulse irradiating positions discussed above with respect to FIGS. 2B and 2C. These steps may be repeated until a desired 3D object has been formed. Additionally, the layer forming station 112, the heating station 120, and/or the pulse irradiating station 206 may be vertically movable, e.g., such that layer forming station 112, the heating station 120, and/or the pulse irradiating station 206 may be moved during movement of the chamber 202.

Figure 3A:
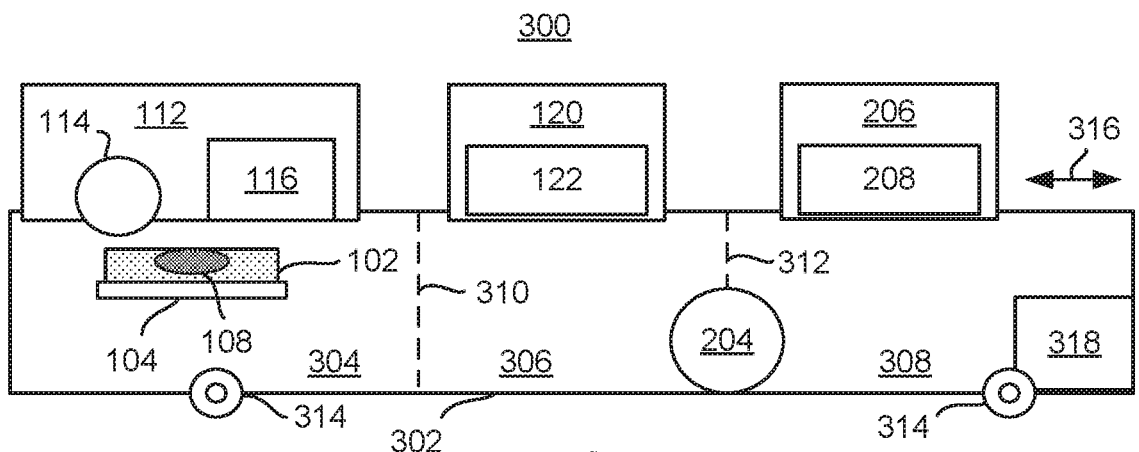
FIGS. 3A-3C, respectively, depict block diagrams of a further example apparatus during multiple stages of operation.
Figure 3B:
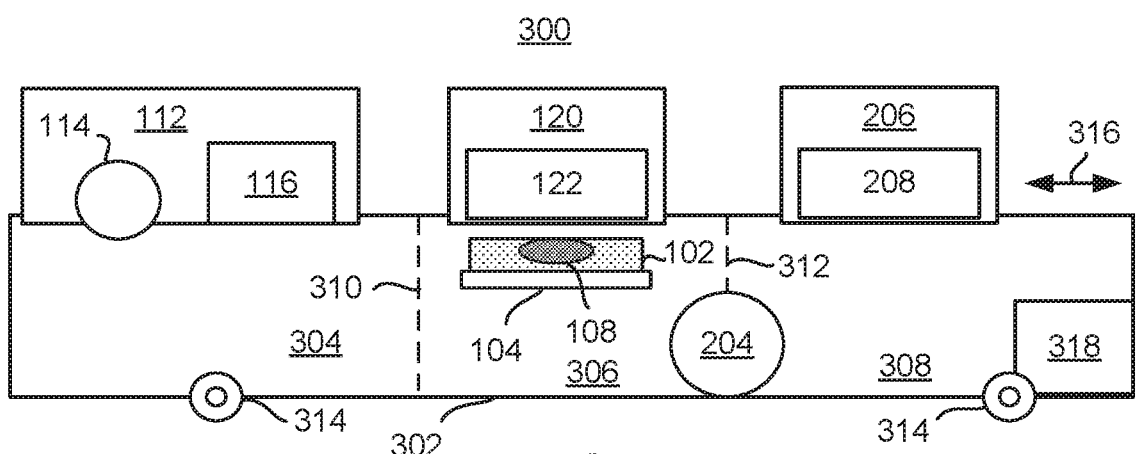
Figure 3C:
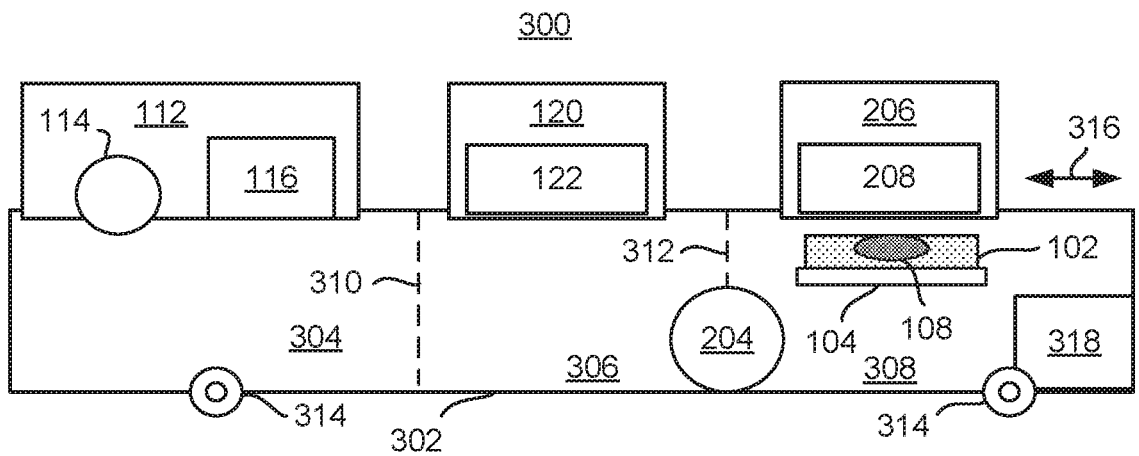

Turning now to FIGS. 3A-3C, there are respectively shown block diagrams of another example apparatus 300 during multiple stages of operation. It should be understood that the apparatus 300 depicted in FIGS. 3A-3C may include additional components and that some of the components described herein may be removed and/or modified without departing from a scope of the apparatus 300 disclosed herein. The apparatus 300 may be similar to the apparatuses 100 and 200 depicted in FIGS. 1A, 1B and 2A-2C and may thus include many of the same elements as those discussed above with respect to the apparatuses 100 and 200. The common elements will therefore not be described in great detail with respect to FIGS. 3A-3C.

With reference first to FIG. 3A, the apparatus 300 may include a chamber 302 that supports a layer forming station 112, a heating station 120, and a pulse irradiating station 206. The layer forming station 112, the heating station 120, and the pulse irradiating station 206 may be supported in or on the chamber 302 in any of the manners discussed above. The apparatus 300 may also include a gas circulation system 204 that may control a composition of gases contained inside the chamber 302 as also discussed above.

According to examples, the chamber 302 may include multiple sub-chambers 304-308 that may be separated from each other by respective partitions 310, 312. As shown in FIG. 3A, the layer forming station 112 may be supported in a first sub-chamber 304, the heating station 120 may be supported in a second sub-chamber 306, and the pulse irradiating station 206 may be supported in a third sub-chamber 308. The partitions 310, 312 may separate the spreading component 114 and the agent delivery component 116 from the heating component 122 and the pulse irradiating component 208 such that, for instance, contamination of the heating component 122 and the pulse irradiating component 208 by build material particles 102 that may become airborne during a layer spreading/fusing agent delivery operation may be reduced. Likewise, the partitions 310, 312 may block or reduce transmission of heat from the heating component 122 and the pulse irradiating component 208 to the agent delivery component 116, which may prolong the life of the agent delivery component 116.

The gas circulation system 204 may control the composition of gases inside one, some, or all of the sub-chambers 304-308 such that the interiors of the sub-chambers 304-308 may have different gas compositions with respect to each other. In examples, therefore, there may be a single gas circulation system 204 for the chamber 302 or multiple gas circulation systems 204 for the sub-chambers 304-308.

As also shown in FIG. 3A, the chamber 302 may be supported on wheels 314 to enable the chamber 302 to be moved in the directions denoted by the arrow 316. In addition to or in other examples, the chamber 302 may be supported on a slidable surface and/or on tracks. In any regard, the chamber 302 may be supported in any suitable manner to enable relative lateral movement of the chamber 302 with respect to the build platform 104. In addition, the apparatus 300 may include an actuator 318 that may move the chamber 302 with respect to the build platform 104. The actuator 318 may be an electric motor that may cause the wheels 314 to rotate. For instance, the actuator 318 may include a gearing system to cause the chamber 302 to move. In addition or in other examples, the actuator 318 may be connected to a belt and pulley system that translates rotation of the actuator 318 into translational movement of the chamber 302. In any regard, the build platform 104 may be supported separately from the chamber 302 such that the chamber 302 may be moved without moving the build platform 104.

FIG. 3A shows a first stage of operation of the apparatus 300 in which the build platform 104 is positioned beneath the layer forming station 112. While in this position, a layer of build material particles 102 may be spread and a fusing agent may be applied onto selected areas of the spread layer of build material particles 102 as discussed herein. Following application of the fusing agent, the chamber 302 may be moved laterally such that the build platform 104 is positioned beneath the heating component 122. This position of the chamber 302 is depicted in FIG. 3B. Additionally, while in the position depicted in FIG. 3B, the heating component 122 may be activated to apply energy 220 onto the layer of build material particles 102 and the fusing agent to raise and maintain the temperature of the build material particles 102 on which the fusing agent has been applied in accordance with a predefined temperature profile as discussed herein.

Following application of the energy 220, the chamber 302 may be moved laterally such that the build platform 104 is positioned beneath the pulse irradiating component 208. This position of the chamber 202 is depicted in FIG. 3C. Additionally, while in the position depicted in FIG. 3C, the pulse irradiating component 208 may be activated to apply a radiation pulse 222 onto the layer of build material particles 102 as discussed above.

Following application of the radiation pulse 222, the build material particles 102 on the topmost layer of build material particles 102 upon which the fusing agent has been delivered may have melted and may begin to harden as those build material particles 102 begin to cool. In addition, the chamber 302 may be moved laterally in an opposite direction to again position the build platform 104 beneath the layer forming station 112. That is, the chamber 302 may be returned to the position shown in FIG. 3A. In addition, the chamber 302 may be moved laterally to the heating and pulse irradiating positions discussed above with respect to FIGS. 3B and 3C. These steps may be repeated until a desired 3D object has been formed.

In examples in which the chamber 302 is separated into sub-chambers 304-308 by the partitions 310, 312, the partitions 310, 312 may include doors that may be opened during movement of the chamber 302. That is, prior to or during movement of the chamber 302 from the position shown in FIG. 3A to the position shown in FIG. 3B, the partition 310 may be opened to enable the partition 310 to pass by the build platform 104. Additionally, prior to the heating component 122 being activated, the partition 310 may be closed. Likewise, prior to or during movement of the chamber 302 from the position shown in FIG. 3B to the position shown in FIG. 3C, the partition 312 may be opened to enable the partition 312 to pass by the build platform 104. Additionally, prior to the pulse irradiating component 208 being activated, the partition 312 may be closed. The partitions 310 and 312 may be opened during a return movement of the chamber 302 to the position shown in FIG. 3A.

Figure 4:
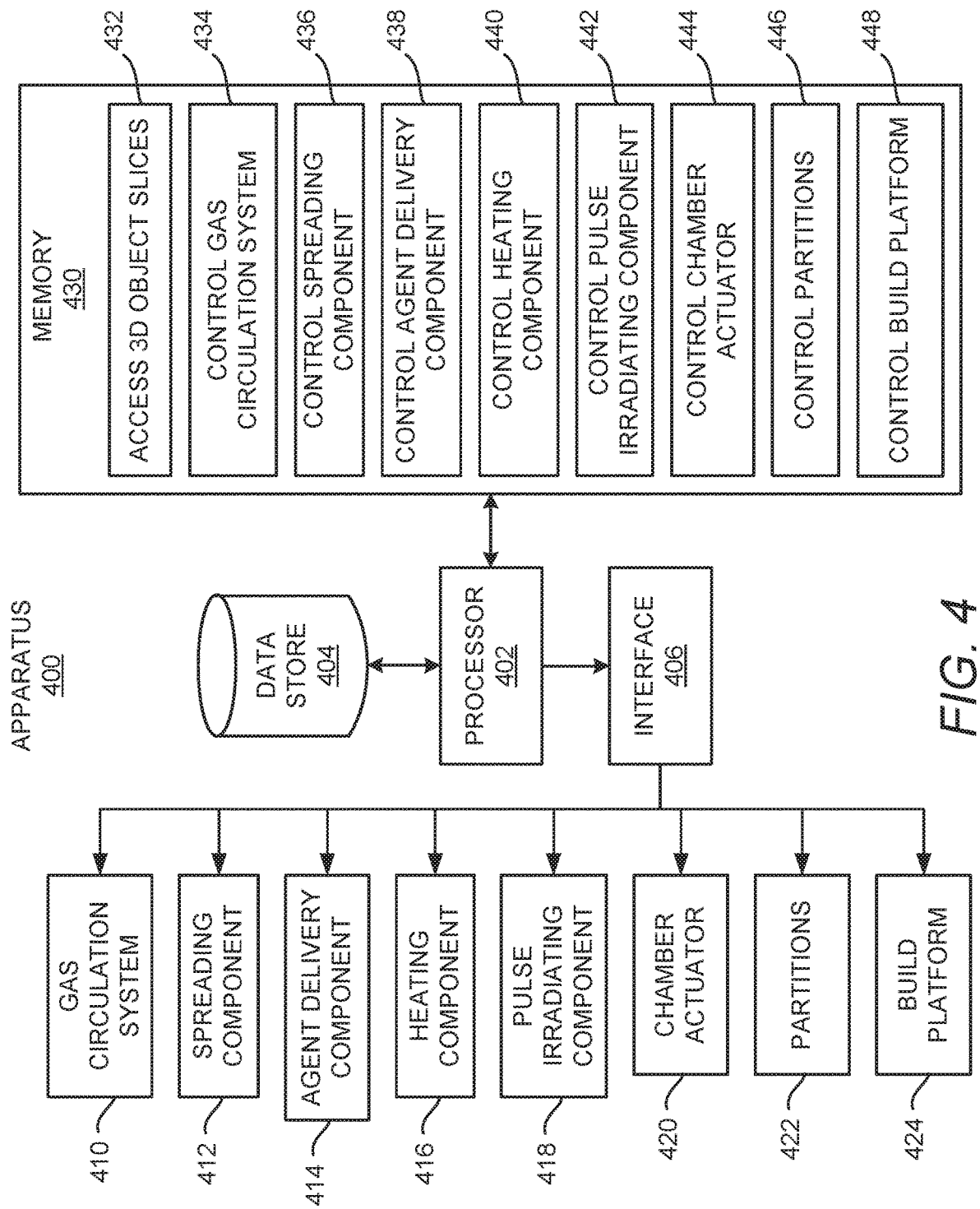
FIG. 4 shows a block diagram of a yet further example apparatus that may be implemented to fabricate 3D objects from build material particles.

With reference now to FIG. 4, there is shown a block diagram of another example apparatus 400, which may also be a 3D fabricating device, a 3D printer, or the like, that may be implemented to fabricate 3D objects from build material particles 102. It should be understood that the apparatus 400 depicted in FIG. 4 may include additional components and that some of the components described herein may be removed and/or modified without departing from a scope of the apparatus 400 disclosed herein. The description of the apparatus 400 is made with reference to FIGS. 1A, 1B, 2A-2C, and 3A-3C.

The apparatus 400 may include a processor 402 that may control operations of the apparatus 400. The processor 402 may be a semiconductor-based microprocessor, a central processing unit (CPU), an application specific integrated circuit (ASIC), a field-programmable gate array (FPGA), and/or other hardware device. The processor 402 may access a data store 404, which may be a Random Access Memory (RAM), an Electrically Erasable Programmable Read-Only Memory (EEPROM), a storage device, an optical disc, and the like. The data store 404 may have stored thereon data pertaining to a 3D object that the apparatus 400 is to fabricate.

The apparatus 400 may also include an interface 406 through which the processor 402 may communicate instructions to a plurality of components contained in the apparatus 400. The interface 406 may be any suitable hardware and/or software through which the processor 402 may communicate the instructions. In some examples, the interface 406 may also enable communication of information from the components to the processor 402. In any regard, the components may include a gas circulation system 410, a spreading component 412, an agent delivery component 414, a heating component 416, a pulse irradiating component 418, a chamber actuator 420, partitions 422, and a build platform 424.

The apparatus 400 may also include a memory 430 that may have stored thereon machine readable instructions 432-446 (which may also be termed computer readable instructions) that the processor 402 may execute. The memory 430 may be an electronic, magnetic, optical, or other physical storage device that contains or stores executable instructions. The memory 430 may be, for example, Random Access memory (RAM), an Electrically Erasable Programmable Read-Only Memory (EEPROM), a storage device, an optical disc, and the like. The memory 430, which may also be referred to as a computer readable storage medium, may be a non-transitory machine-readable storage medium, where the term "non-transitory" does not encompass transitory propagating signals.

The processor 402 may fetch, decode, and execute the instructions 432 to access 3D object slices, in which each slice may identify (e.g., contain instructions about) a section 108 of a 3D object that is to be formed in a particular layer of build material particles 102. The processor 402 may fetch, decode, and execute the instructions 434 to control the gas circulation system 410. The processor 402 may fetch, decode, and execute the instructions 436 to control the spreading component 412. The processor 402 may fetch, decode, and execute the instructions 438 to control the agent delivery component 414. The processor 402 may fetch, decode, and execute the instructions 440 to control the heating component 416. The processor 402 may fetch, decode, and execute the instructions 442 to control the pulse irradiating component 418. The processor 402 may fetch, decode, and execute the instructions 444 to control the chamber actuator 420. The processor 402 may fetch, decode, and execute the instructions 446 to control the partitions 422. The processor 402 may fetch, decode, and execute the instructions 448 to control the build platform 424.

Figure 5:
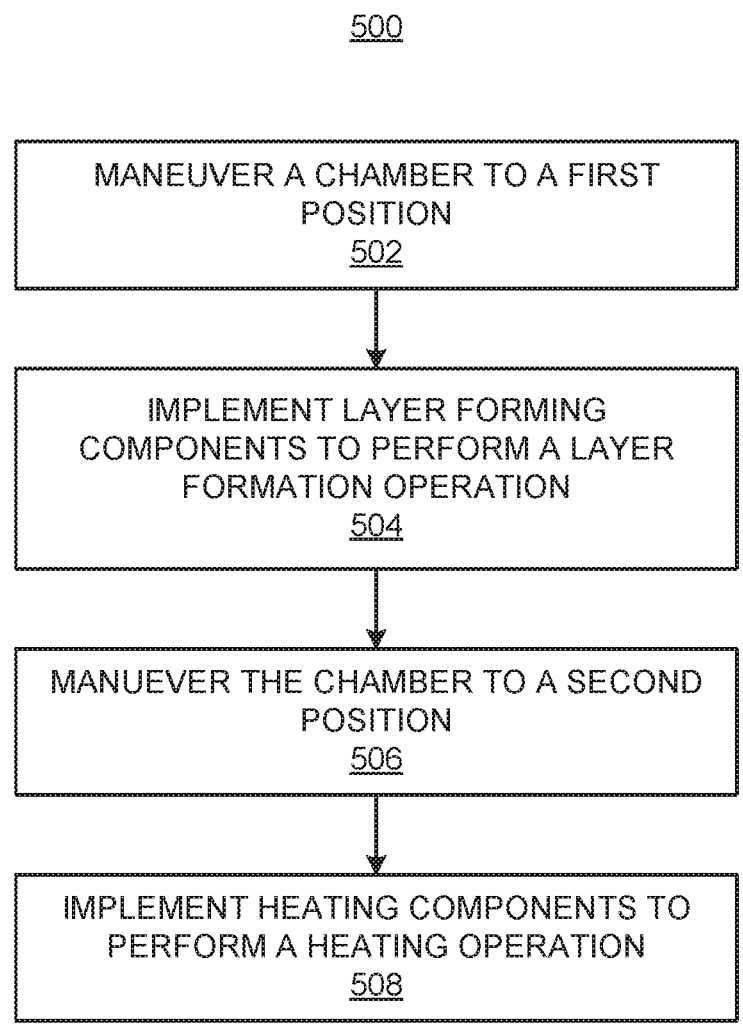
FIGS. 5 and 6, respectively, depict flow diagrams of example methods for performing 3D printing operations.
Figure 6:
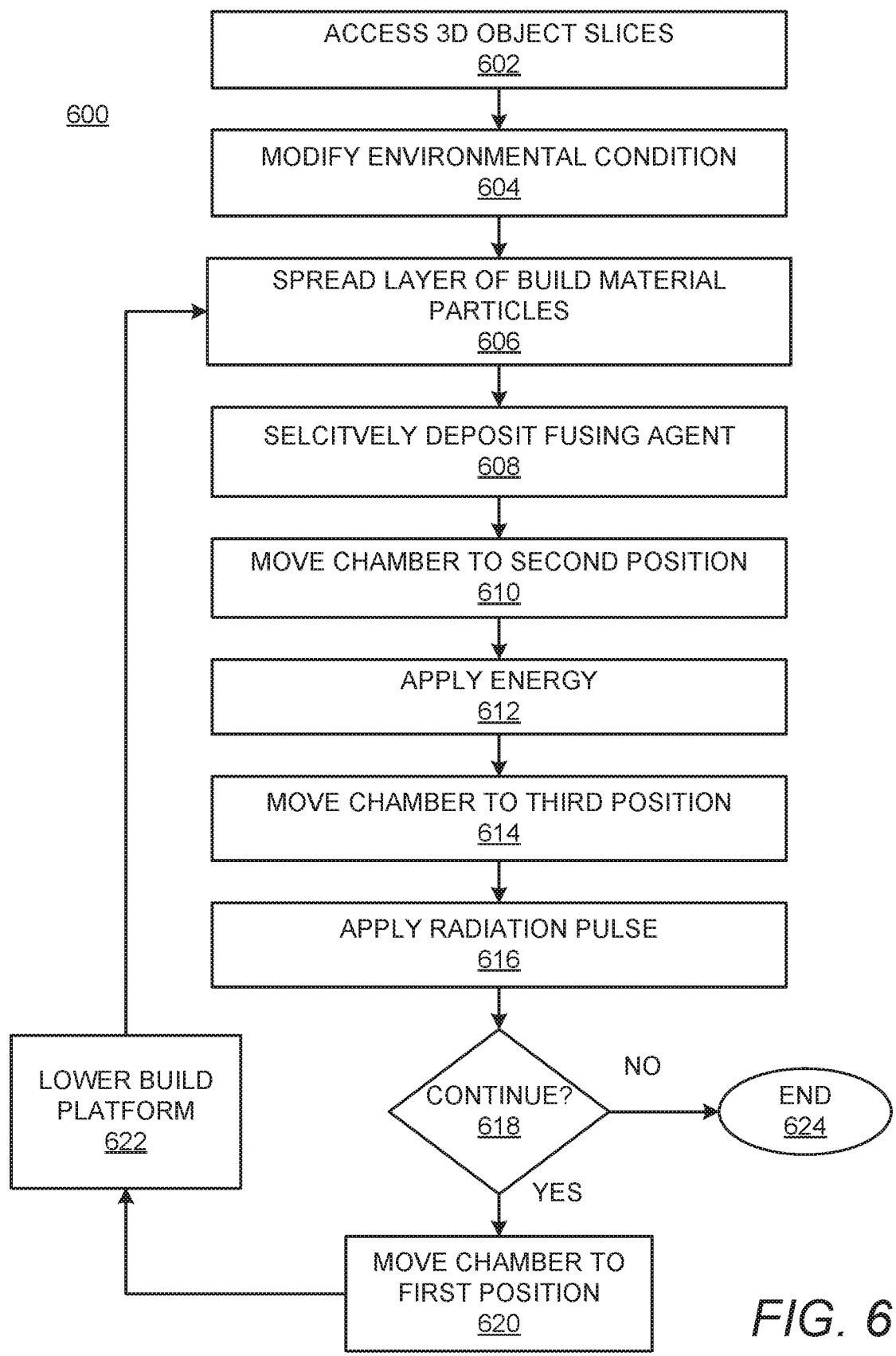

Various manners in which the apparatus 400 may be implemented are discussed in greater detail with respect to the methods 500 and 600 depicted in FIGS. 5 and 6. Particularly, FIGS. 5 and 6, respectively, depict flow diagrams of example methods 500 and 600 for performing 3D printing operations. It should be understood that the methods 500 and 600 depicted in FIGS. 5 and 6 may include additional operations and that some of the operations described therein may be removed and/or modified without departing from the scopes of the methods 500 and 600. The descriptions of the methods 500 and 600 are made with reference to the features depicted in FIGS. 1A-4 for purposes of illustration.

With reference first to FIG. 5, at block 502, a chamber 110, 202, 302 containing a layer forming station 112 and a heating station 120 may be maneuvered to a first position with respect to a build platform 104, 424, which may be housed inside the chamber 110, 202, 302. For instance, the processor 402 may execute the instructions 444 to control a chamber actuator 130, 216, 318, 420 to move the chamber 110, 202, 302 to the first position. In the first position, the build platform 104, 424 may be positioned beneath the layer forming station 112 as shown in FIGS. 1A, 2A, and 3A.

At block 504, layer forming components of the layer forming station 112 may be implemented to perform a layer forming operation on build material particles 102 on the build platform 104, 424 while the chamber 110, 202, 302 is in the first position. For instance, the processor 402 may execute the instructions 436 to control a spreading component 114, 412 to spread a layer of build material particles 102 onto the build platform 104, 424. In addition, the processor 402 may execute the instructions 438 to control an agent delivery component 116, 414 to apply fusing agent onto selected locations on the spread layer of build material particles 102.

At block 506, the chamber 110, 202, 302 may be maneuvered to a second position from the first position. For instance, the processor 402 may execute the instructions 444 to control the chamber actuator 130, 216, 318, 420 to move the chamber 110, 202, 302 to the second position. In the second position, the build platform 104, 424 may be positioned beneath the heating station 120 as shown in FIGS. 1B, 2B, and 3B.

At block 508, a heating component 122, 416 of the layer forming station 120 may be implemented to perform a heating operation on the build material particles 102 while the chamber 110, 202, 302 is in the second position. For instance, the processor 402 may execute the instructions 440 to control the heating component 122, 416 to apply heat on the build material particles 102. As discussed above, in some examples, the heating component 122, 416 may apply sufficient heat to raise and maintain a temperature of the build material particles 102 to a certain level without causing the build material particles 102 upon which the fusing agent has been deposited to melt. In other examples, the heating component 122, 416 may apply sufficient heat to cause build material particles 102 upon which fusing agent has been deposited to melt without causing build material particles 102 upon which fusing agent has not been deposited to not melt.

With reference now to FIG. 6, at block 602, 3D object slices may be accessed. For instance, the processor 402 may execute the instructions 432 to access the 3D object slices, in which each slice may identify a section 108 of a 3D object that is to be formed in a particular layer of build material particles 102. The processor 402 may access the 3D object slices from the data store 404, from a user input, over a network, etc.

At block 604, an environmental condition inside of a chamber 110, 202, 302 may be modified. For instance, the processor 402 may execute the instructions 434 to control a gas circulation system 204, 410 to modify the environmental condition inside of the chamber 110, 202, 302. By way of particular example, the processor 402 may control the gas circulation system 204, 410 to introduce an inert gas into the chamber 110, 202, 302 to mix with and/or replace oxygen contained in the chamber 110, 202, 302. As discussed above, the gas circulation system 204, 410 may control the environmental condition inside a single chamber 110, 202, 302 or in multiple sub-chambers the 304-308. As also discussed above, the chamber 110, 202, 302 may house a build platform 104, 424 and may support a layer forming station 112 and a heating station 120.

At block 606, a layer of build material particles 102 may be spread across the build platform 104, 424. For instance, the processor 402 may execute the instructions 436 to control a spreading component 114, 412 to spread a pile of build material particles 102 across the build platform 104, 424 to form the layer of build material particles 102.

At block 608, a fusing agent may be selectively deposited onto the spread layer of build material particles 102. For instance, the processor 402 may execute the instructions 438 to control an agent delivery component 116, 414 to apply the fusing agent onto selected locations on the spread layer of build material particles 102. The fusing agent may be applied according to the 3D object slice accessed at block 602, which may indicate the shape of the slice of the portion 108 that is to be formed in the layer.

At block 610, the chamber 110, 202, 302 may be moved to a second position. For instance, the processor 402 may execute the instructions 444 to control a chamber actuator 130, 216, 318, 420 to move the chamber 110, 202, 302 from a first position in which the build platform 104, 424 is positioned beneath the layer forming station 112 to a second position in which the build platform 104, 424 is positioned beneath the heating station 120. As discussed above, the movement may be a rotational movement and/or a translational movement. Additionally, in examples in which the chamber 302 is composed of multiple sub-chambers 304-308 that are separated by partitions 310, 312, 422 the processor 402 may execute the instructions 446 to control the partitions 310, 312, 422 to open during movement of the chamber 302 such that the chamber 302 may be moved with respect to the build platform 104.

At block 612, energy may be applied onto the spread layer of build material particles 102 and the applied fusing agent. For instance, the processor 402 may execute the instructions 440 to control a heating component 122, 416 to apply energy, e.g., light, heat, radiation, or the like. As discussed above, in some examples, the processor 402 may control the heating component 122, 416 to apply sufficient heat to raise and maintain a temperature of the build material particles 102 to a certain level without causing the build material particles 102 upon which the fusing agent has been deposited to melt. In other examples, the heating component 122, 416 may apply sufficient heat to cause build material particles 102 upon which fusing agent has been deposited to melt without causing build material particles 102 upon which fusing agent has not been deposited to not melt. In any regard, the processor 402 may also control the environmental condition inside chamber 110, 202, 302 through control of the heating component 122, 416. For instance, a temperature sensor (not shown) may be included inside the chamber 110, 202, 302 and the processor 402 may control the heating component 122, 416 (or another heater) to increase the temperature inside the chamber 110, 202, 302 if the detected temperature is below a certain level.

At block 614, the chamber 110, 202, 302 may be moved to a third position. For instance, the processor 402 may execute the instructions 444 to control the chamber actuator 130, 216, 318, 420 to move the chamber 110, 202, 302 from the second position in which the build platform 104, 424 is positioned beneath the heating station 120 to a third position in which the build platform 104, 424 is positioned beneath a pulse irradiating station 206. As discussed above, the movement may be a rotational movement and/or a translational movement.

At block 616, a radiation pulse may be applied to the heated build material particles 102 and the fusing agent on the build material particles 102. For instance, the processor 402 may execute the instructions 442 to control a pulse irradiating component 208, 416 to apply an instantaneous pulse, burst, flash, or sub-flashes of radiation in the form of electromagnetic radiation. The pulse of radiation may be applied to instantaneously raise the temperature of the build material particles 102 on which the fusing agent has been deposited to a point at which a desired transformation, such as melting, sintering, etc., may occur.

At block 618, a determination may be made as to whether the method 600 is to continue. The processor 402 may make this determination, for instance, based upon whether each of the sections 108 defined by the 3D object slices accessed at block 602 has been formed. In response to a determination that an additional section 108 is to be formed, the chamber 110, 202, 302 may be moved back to the first position. For instance, the processor 402 may execute the instructions 444 to control the chamber actuator 130, 216, 318, 420 to move the chamber 110, 202, 302 from the third position in which the build platform 104, 424 is positioned beneath the pulse irradiating station 206 to the first position in which the build platform 104, 424 is positioned beneath the layer forming station 112. As discussed above, the movement may be a rotational movement and/or a translational movement. In this regard, moving the chamber 110, 202, 302 from the third position to the first position may include moving the chamber 110, 202, 302 in a direction that is opposite from the movement from the first position to the second position as well as from the second position to the third position.

At block 622, the build platform 104, 424 may be lowered. For instance, the processor 402 may execute the instructions 448 to control the build platform 104, 424 such that the build platform 104, 424 is lowered. The processor 402 may lower the build platform 104, 424 a predefined distance to enable a next layer of build material particles 102 to be formed on top of the previous layer of build material particles 102.

Additionally, blocks 606-622 may be repeated for additional sections 108 identified in the 3D object slices accessed at block 602. That is, blocks 606-622 may be repeated until the processor 402 determines at block 618 that the method 600 is not to be continued. In response to a determination that the method 600 is not be continued, the method 600 may end as indicated at block 624. After block 624, the 3D object may have been formed.

Some or all of the operations set forth in the methods 500 and 600 may be contained as utilities, programs, or subprograms, in any desired computer accessible medium. In addition, the methods 500 and 600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a build platform;
a chamber housing the build platform, wherein the chamber includes:
a curved top surface located above the build platform and carrying a layer forming station and a heating station, and
a pivot member located at a bottom of the chamber, below the build platform, wherein when the pivot member is rotated, the curved top surface of the chamber rotates in accordance with the pivot member to sequentially move each of the layer forming station and the heating station to a position directly above the build platform,
wherein the layer forming station includes a spreading component to spread a layer of build material particles onto the build platform and an agent delivery component to deposit fusing agent onto selected locations on the spread layer of build material particles; and the heating station includes a heating component to apply energy onto the spread layer of build material particles on which the fusing agent has been deposited; and
an actuator to rotate the pivot member of the chamber to cause each of the layer forming station and the heating station in the curved top surface to sequentially be positioned directly above the build platform.

2. The apparatus according to claim 1, wherein the actuator is to rotate the chamber from a first position in which the layer forming station is positioned directly above the build platform to a second position in which the heating station is positioned directly above the build platform.

3. The apparatus according to claim 2, wherein the actuator is to rotate the chamber from the first position to the second position while the build platform remains stationary.

4. The apparatus according to claim 2, further comprising: a pulse irradiating station attached to the curved top surface of the chamber, the pulse irradiating station including a pulse irradiating component to apply an irradiation pulse onto the build material particles, and wherein the actuator is to rotate the chamber from the second position to a third position in which the pulse irradiating station is positioned directly above the build platform.

5. The apparatus according to claim 4, wherein the actuator is further to rotate the chamber from the second position to the third position by rotating the pivot member of the chamber.

6. The apparatus according to claim 1, wherein the build platform is vertically movable to enable successive layers of the build material particles to be spread on the build platform.

7. The apparatus according to claim 1, wherein the chamber is composed of sub-chambers, wherein the layer forming station is contained in a first sub-chamber and the heating station is contained in a second sub-chamber and wherein the second sub-chamber is separated from the first sub-chamber.

8. The apparatus according to claim 1, further comprising:
a gas circulation system to control an environmental condition inside the chamber.

9. An apparatus comprising:
a build platform;
a vessel housing the build platform, wherein the vessel includes:
- a curved top surface located above the build platform and carrying a layer forming station, a heating station, and a pulse irradiating station, and
- a pivot member located at a bottom of the vessel, below the build platform, wherein when the pivot member is rotated, the curved top surface of the vessel rotates in accordance with the pivot member to sequentially move each of the layer forming station and the heating station to a position directly above the build platform,
- the layer forming station including a spreading component to spread a layer of build material particles onto the build platform and an agent delivery component to deposit fusing agent onto selected locations on the spread layer of build material particles;
- the heating station including a heating component to apply energy onto the spread layer of build material particles on which the fusing agent has been deposited, wherein the heating station is spaced from the layer forming station; and
- the pulse irradiating station that includes a pulse irradiating component to apply an irradiation pulse onto the spread layer of build material particles on which the fusing agent has been deposited, wherein the pulse irradiating station is spaced from the layer forming station and the heating station; and an actuator to rotate the pivot member of the vessel to cause the layer forming station, the heating station, and the pulse irradiating station to be rotated and sequentially positioned directly above the build platform.

10. The apparatus according to claim 9, wherein the build platform is vertically movable to enable successive layers of the build material particles to be spread on the build platform.

11. The apparatus according to claim 9, further comprising:
a gas circulation system to control an environmental condition inside the vessel.

* * * * *